United States Patent
Dill

(10) Patent No.: US 9,856,901 B2
(45) Date of Patent: Jan. 2, 2018

(54) FASTENER WITH SAW TOOTH PERIMETER

(71) Applicant: Illinois Tool Works Inc., Glenview, IL (US)

(72) Inventor: Michael C. Dill, Elk Grove Village, IL (US)

(73) Assignee: Illinois Tool Works Inc., Glenview, IL (US)

( * ) Notice: Subject to any disclaimer, the term of this patent is extended or adjusted under 35 U.S.C. 154(b) by 52 days.

(21) Appl. No.: 15/078,014

(22) Filed: Mar. 23, 2016

(65) Prior Publication Data

US 2016/0290382 A1 Oct. 6, 2016

Related U.S. Application Data

(60) Provisional application No. 62/139,867, filed on Mar. 30, 2015.

(51) Int. Cl.
*F16B 35/06* (2006.01)
*F16B 25/00* (2006.01)

(52) U.S. Cl.
CPC ............ *F16B 35/065* (2013.01); *F16B 35/06* (2013.01); *F16B 25/0015* (2013.01)

(58) Field of Classification Search
CPC .... F16B 23/00; F16B 23/003; F16B 25/0015; F16B 35/04; F16B 35/06; F16B 35/065
USPC ......................................... 411/399, 402–403
See application file for complete search history.

(56) References Cited

U.S. PATENT DOCUMENTS

| | | | | |
|---|---|---|---|---|
| 29,963 A * | 9/1860 | Freeman | ................. | F16B 35/06 411/399 |
| 234,759 A * | 11/1880 | Eckford | .................. | F16B 35/06 411/399 |
| 298,427 A * | 5/1884 | Stone | ...................... | F16B 35/06 411/399 |
| 378,614 A * | 2/1888 | Palmer | .................... | F16B 35/06 411/399 |
| 388,000 A * | 8/1888 | Rider | ...................... | F16B 35/06 411/399 |
| 877,131 A * | 1/1908 | Searelle | ................. | F16B 35/06 411/399 |
| 1,151,861 A * | 8/1915 | Brumback | .............. | F16B 35/06 411/399 |
| 1,238,636 A * | 8/1917 | Christofferson | ........ | F16B 35/06 411/399 |
| 2,226,491 A * | 12/1940 | Gustafson | ............... | F16B 35/06 411/186 |
| 3,230,994 A * | 1/1966 | Rosan | ................... | B25B 27/143 29/523 |
| 6,402,757 B1 * | 6/2002 | Moore, III | ........... | A61B 17/862 606/104 |

(Continued)

FOREIGN PATENT DOCUMENTS

GB 2358688 A 1/2001

*Primary Examiner* — Roberta S Delisle
(74) *Attorney, Agent, or Firm* — Christopher R. Carroll; The Small Patent Law Group LLC

(57) ABSTRACT

A fastener includes an elongated shank body having one or more helical threads and a head connected with the body. The head can include a drive design indentation extending into a first side of the head that is configured to be engaged with a drive tool. The head also includes radially projecting saw teeth extending around an outer perimeter of the head.

20 Claims, 4 Drawing Sheets

(56) References Cited

U.S. PATENT DOCUMENTS

| | | | |
|---|---|---|---|
| 7,293,949 B2* | 11/2007 | Dilling | B21K 5/20 411/403 |
| 8,348,575 B2* | 1/2013 | Walther | F16B 25/0015 411/399 |
| 8,757,949 B2 | 6/2014 | Harvey | |

* cited by examiner

FASTENER WITH SAW TOOTH PERIMETER

CROSS-REFERENCE TO RELATED APPLICATIONS

This application claims priority to U.S. Provisional Application No. 62/139,867, filed 30-Mar.-2015, the entire disclosure of which is incorporated herein by reference.

BACKGROUND

Embodiments of the inventive subject matter described herein relate to fasteners, such as screws.

BRIEF DESCRIPTION

In one embodiment, a fastener includes an elongated shank body having one or more helical threads and a head connected with the body. The head can include a drive design indentation extending into a first side of the head that is configured to be engaged with a drive tool. The head also includes radially projecting saw teeth extending around an outer perimeter of the head.

In another embodiment, a fastener includes an elongated shank body having one or more threads and a head connected with the body and configured to be engaged with a drive tool. The head includes curved saw teeth extending around an outer perimeter of the head.

In another embodiment, a fastener includes an elongated shank body and a head connected with the body. The head includes curved radially projecting saw teeth extending around an outer perimeter of the head.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
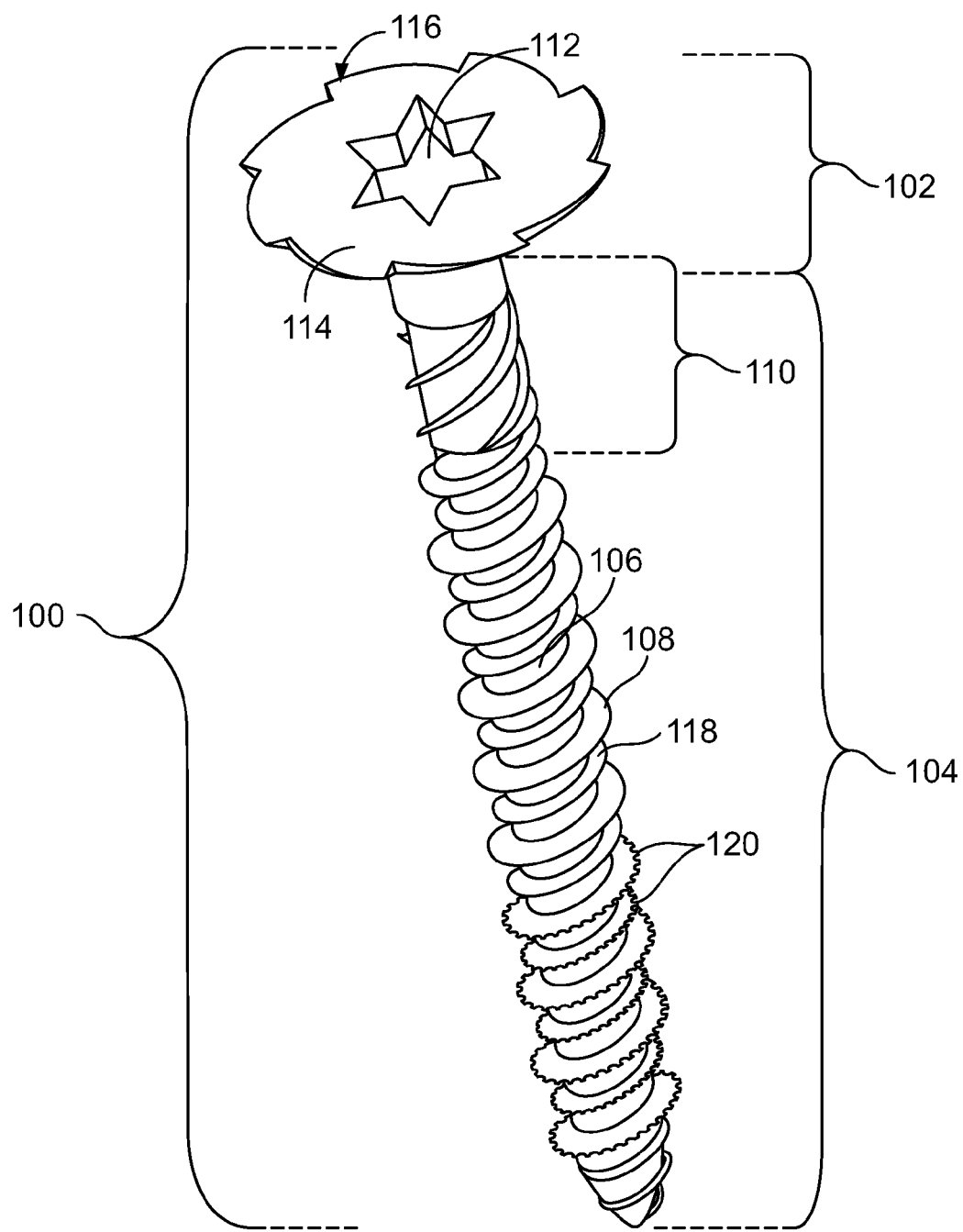
FIG. 1 is a perspective view of a fastener according to one embodiment.

FIG. 1 is a perspective view of a fastener 100 according to one embodiment. The fastener 100 may represent a screw that can be used to fasten two or more bodies together. The fastener 100 includes a head 102 joined with an elongated shank body 104. The head 102 and the body 104 may be formed as a single body, such as a single piece of metal or metal alloy.

The shank body 104 includes an elongated cylindrical core 106 having helical threads 108, 118 radially extending outward from the core 106. The helical threads 108, 118 can cut into one or more bodies that the fastener 100 is rotated or screwed into in order to secure the fastener 100 to the bodies. In the illustrated embodiment, the helical threads 108, 118 are different sizes. The helical thread 108 outwardly protrudes farther from the core 106 along radial directions from a center axis of the shank body 104 than the helical thread 118. The threads 108, 118 may be referred to as a double lead thread combination.

Also shown in the illustrated embodiment are serrated edges 120 of the threads 108, 118. The serrated edges 120 may assist the threads 108, 118 in more easily cutting through the material in which the fastener 100 is screwed. The serrated edges 120 may extend along the threads 108, 118 for a portion, but not the entire length, of the shank 104 body. For example, the serrated edges 120 can extend from the end of the fastener 100 to a location that is approximately one third of the length of the shank body 104. Alternatively, the serrated edges 120 can extend farther or along the entire length of the shank body 104.

In the illustrated embodiment, the shank body 104 includes a sizing knurl 110 that extends from the head 102 to the helical thread 108. The sizing knurl 110 separates the thread 108 from the head 102 to reduce movement of one or more bodies into which the fastener 100 is screwed when countersinking the fastener 100 into one or more of the bodies. For example, the knurl 108 can allow for the shank body 104 to be screwed farther into the bodies without the helical thread 108 continuing to cut into the bodies. This can reduce the movement of one or more of the bodies and/or can reduce the amount of torque needed to screw the shank body 104 into the bodies.

The head 102 includes a drive design indentation 112 extending into a first side or surface 114 of the head 102. The first side 114 of the head 102 may be the side that faces a drive tool that is used to screw the fastener 100 into one or more bodies. The drive design indentation 112 receives one end of the drive tool, such as a screwdriver, drill bit, or the like, so that the drive tool is engaged with the fastener 100. Rotation of the drive tool rotates the fastener 100 via the connection between the drive tool and the drive design indentation 112 in the head 102. The drive design indention 112 is shown in FIG. 1 as a TORX screw drive type, but alternatively may be another type of screw drive, such as a slot, a PHILLIPS, a POZIDRIV, a square, a ROBERTSON, a HEX, a HEX SOCKET, or the like.

Figure 2:
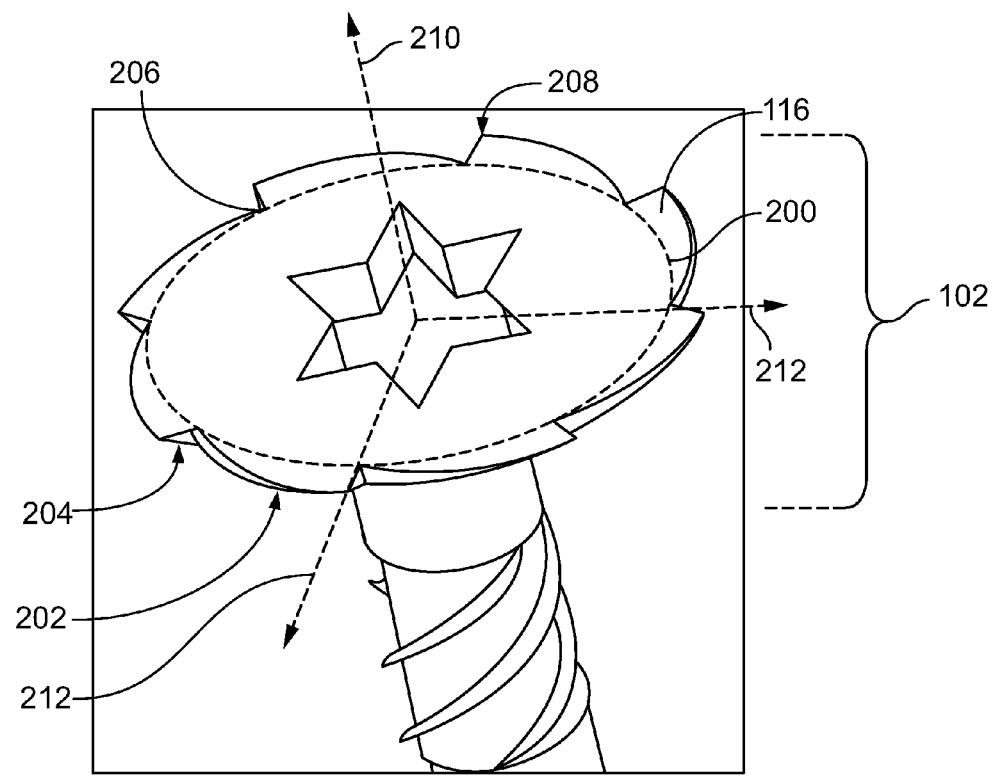
FIG. 2 illustrates a perspective view of a head of the fastener shown in FIG. 1 according to one embodiment.

With continued reference to FIG. 1, FIG. 2 illustrates a perspective view of the head 102 of the fastener 100 shown in FIG. 1 according to one embodiment. The head 102 includes several saw teeth 116. The saw teeth 116 radially project outward from the head 102. For example, without the saw teeth 116, the head 102 may have a circular shape as indicated by a dashed line 200 shown in FIG. 2. The dashed line 200 can represent an outer perimeter of the head 102 without the saw teeth 116. The saw teeth 116 radially project outward from this outer perimeter 200 of the head 102.

The saw teeth 116 shown in FIGS. 1 and 2 also extend around the outer perimeter 200 of the head 102. For example, eight saw teeth 116 are arranged around the outer perimeter 200 of the head 102. Alternatively, another number of the saw teeth 116 may extend around the outer perimeter 200 of the head 102.

The saw teeth 116 include outer edges 202, 204. In the illustrated embodiment, the outer edges 202 are curved edges and the outer edges 204 are straight edges. Alternatively, one or more of the outer edges 200 may be a straight edge and/or one or more of the outer edges 204 may be a curved edge. The outer edges 202 are convex surfaces that are curved in a clockwise direction in the illustrated embodiment. For example, the outer edges 202 may extend from one end 206 that intersects the outer perimeter 200 of the head 102 to another end 208 that intersects the outer edge 204. The outer edges 202 may be surfaces that are curved in a clockwise direction in that the ends 206 of the outer edges 202 are closer to a center axis 210 of the head 102 and/or fastener 100 than the ends 208. Alternatively, one or more of the outer edges 202 may be curved in a counter-clockwise direction such that the ends 208 are closer to the center axis 210 of the head 102 and/or fastener 100 than the ends 206.

The outer edges 204 may radially project along straight lines or directions 212 from the center axis 210. For example, the directions 212 along which the outer edges 204 extend from the outer perimeter 200 of the head 102 may intersect at the center axis 210. Alternatively, the directions 212 along which the outer edges 204 project may not intersect each other at the center axis 210. While only two of the directions 212 are shown in FIG. 2, each of the outer edges 204 may project along similar directions 212.

The saw teeth 116 of the head 102 form a serrated outer edge of the head 102. This serrated outer edge can assist in countersinking the fastener 100 into a body, such as a block of material being fastened to another body using the fastener 100. During rotation of the fastener 100, the saw teeth 116 may dig into and cut into the body that the fastener 100 is being screwed into. The fastener 100 may be screwed into one or more bodies at an angle with respect to the bodies. For example, the center axis 210 of the fastener 100 may be oriented at an oblique angle with respect to a surface of a body into which the fastener 100 is being screwed. As the fastener 100 works into the body, the saw teeth 116 of the head 102 of the fastener 100 may cut into the surface of the body. The saw teeth 116 can cut away and remove portions of the body such that the head 102 can be at least partially inserted into the body (e.g., so that the head 102 can be countersunk into the body). The saw teeth 116 can cut into the body more efficiently (e.g., with less torque applied to the fastener 100) than fasteners that do not include the saw teeth 116.

Figure 3:
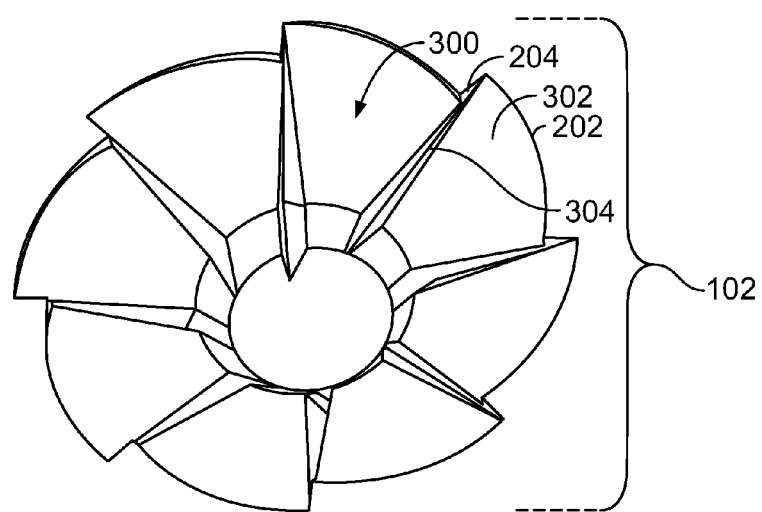
FIG. 3 is bottom view of the head of the fastener shown in FIGS. 1 and 2 according to one embodiment.

FIG. 3 is bottom view of the head 102 of the fastener 100 shown in FIGS. 1 and 2 according to one embodiment. The shank body 104 shown in FIG. 1 is not shown in FIG. 3. A second side or surface 300 of the head 102 is shown in FIG. 3. The second side or surface 300 of the head 102 is opposite of the first side 114 (shown in FIG. 1) of the head 102, and can face the surface of the body into which the fastener 100 is screwed. The second side 300 of the head 102 includes ramped surfaces 302. The ramped surfaces 302 are oriented at oblique angles with respect to the first side 114 of the head 102. The ramped surfaces 302 of the head 102 intersect the outer edges 204 of the saw teeth 116 to form cutting interfaces 304 of the saw teeth 116.

Figure 4:
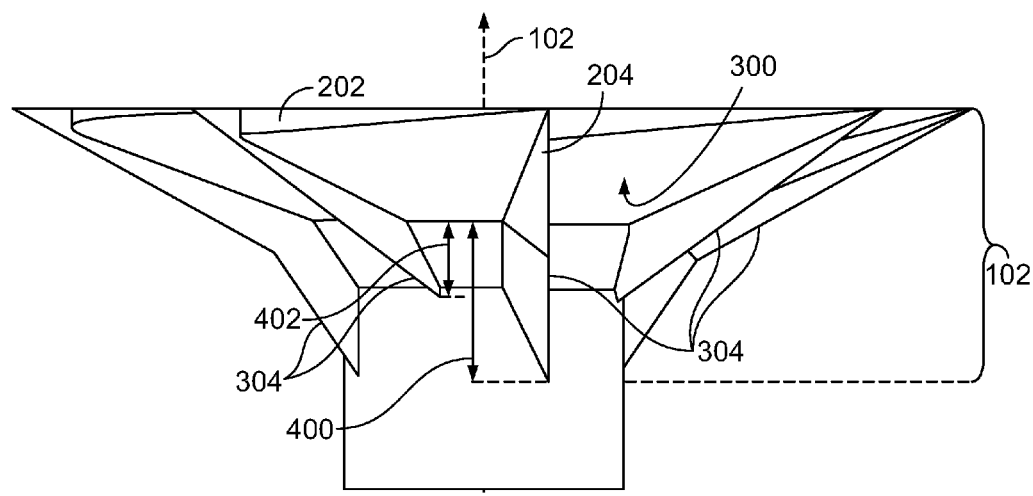
FIG. 4 illustrates a side view of the head of the fastener shown in FIGS. 1 through 3.

FIG. 4 illustrates a side view of the head 102 of the fastener 100 shown in FIGS. 1 through 3. The cutting interfaces 304 project from the second side 300 of the head 102. For example, the cutting interfaces 304 extend downward from the second side 300 of the head 102 in directions that are parallel to the center axis 210 of the fastener 100. Alternatively, the cutting interfaces 304 may project in other directions. The cutting interfaces 304 can form sharp edges of the saw teeth 116 that cut into the body that the fastener 100 is being screwed. The ramped surfaces 302 can assist in directing material that is cut away from this body in directions away from the cutting interfaces 304. Moving this material away can reduce the amount of torque required to screw the fastener 100 into the body.

In the illustrated embodiment, different cutting interfaces 304 extend different distances along the shank body 120. For example, every other cutting interface 304 may extend a first distance 400 down the shank body 120 from the surface 300, while the other cutting interfaces 304 may extend a shorter, second distance 402 down the shank body 120 from the surface 300. Alternatively, the cutting interfaces 304 may extend the same distance or different groups of the cutting interfaces 304 may extend different distances.

Figure 5:
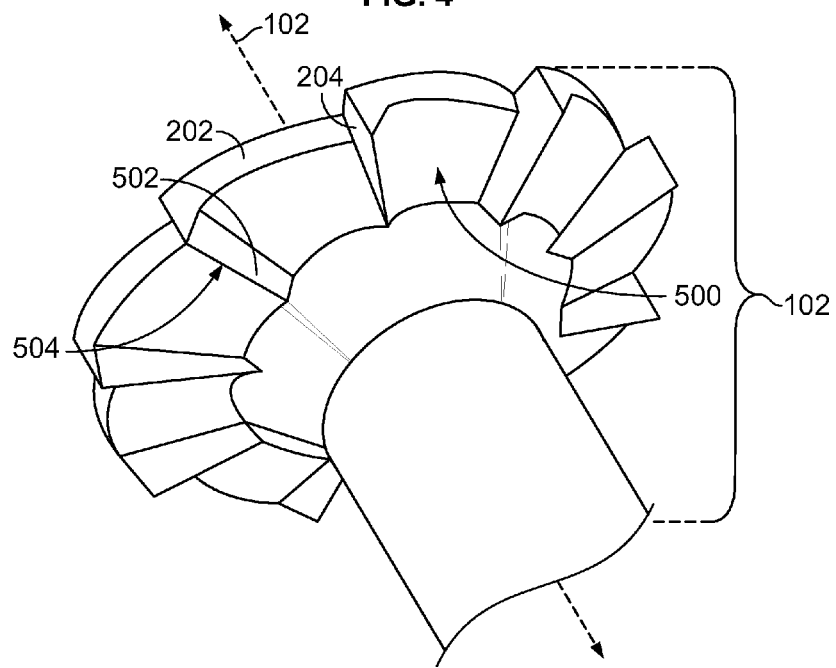
FIG. 5 is perspective view of a second side or surface of the head of the fastener shown in FIGS. 1 and 2 according to another embodiment.

FIG. 5 is perspective view of a second side or surface 500 of the head 102 of the fastener 100 shown in FIGS. 1 and 2 according to another embodiment. The second side or surface 500 of the head 102 is opposite of the first side 114 (shown in FIG. 1) of the head 102, and can face the surface of the body into which the fastener 100 is screwed. The second side 500 of the head 102 includes ramped surfaces 502. The ramped surfaces 502 are oriented at oblique angles with respect to the first side 114 of the head 102. The ramped surfaces 502 of the head 102 intersect the outer edges 204 of the saw teeth 116 to form cutting interfaces 504 of the saw teeth 116. As shown in FIG. 5, the outer surfaces 202 of the saw teeth 114 may have the shape of the letter L. Alternatively, the outer surfaces 202 may have another shape.

The cutting interfaces 504 project from the second side 500 of the head 102. For example, the cutting interfaces 504 extend downward from the second side 500 of the head 102 in directions that are parallel to the center axis 210 of the fastener 100. Alternatively, the cutting interfaces 504 may project in other directions. The cutting interfaces 504 can form sharp edges of the saw teeth 116 that cut into the body that the fastener 100 is being screwed. The ramped surfaces 502 can assist in directing material that is cut away from this body in directions away from the cutting interfaces 504. Moving this material away can reduce the amount of torque required to screw the fastener 100 into the body.

The fastener 100 may be manufactured using any of several different methods. In one embodiment, a method for manufacturing the fastener 100 includes cutting a length of wire into an approximate length of the fastener 100, and then cutting the head 102 of the fastener into the shape shown in FIGS. 1-3 using a die punching process. The thread or threads 108 also may be cut into the wire to form the fastener 100. Alternatively, another method may be used.

Figure 6:
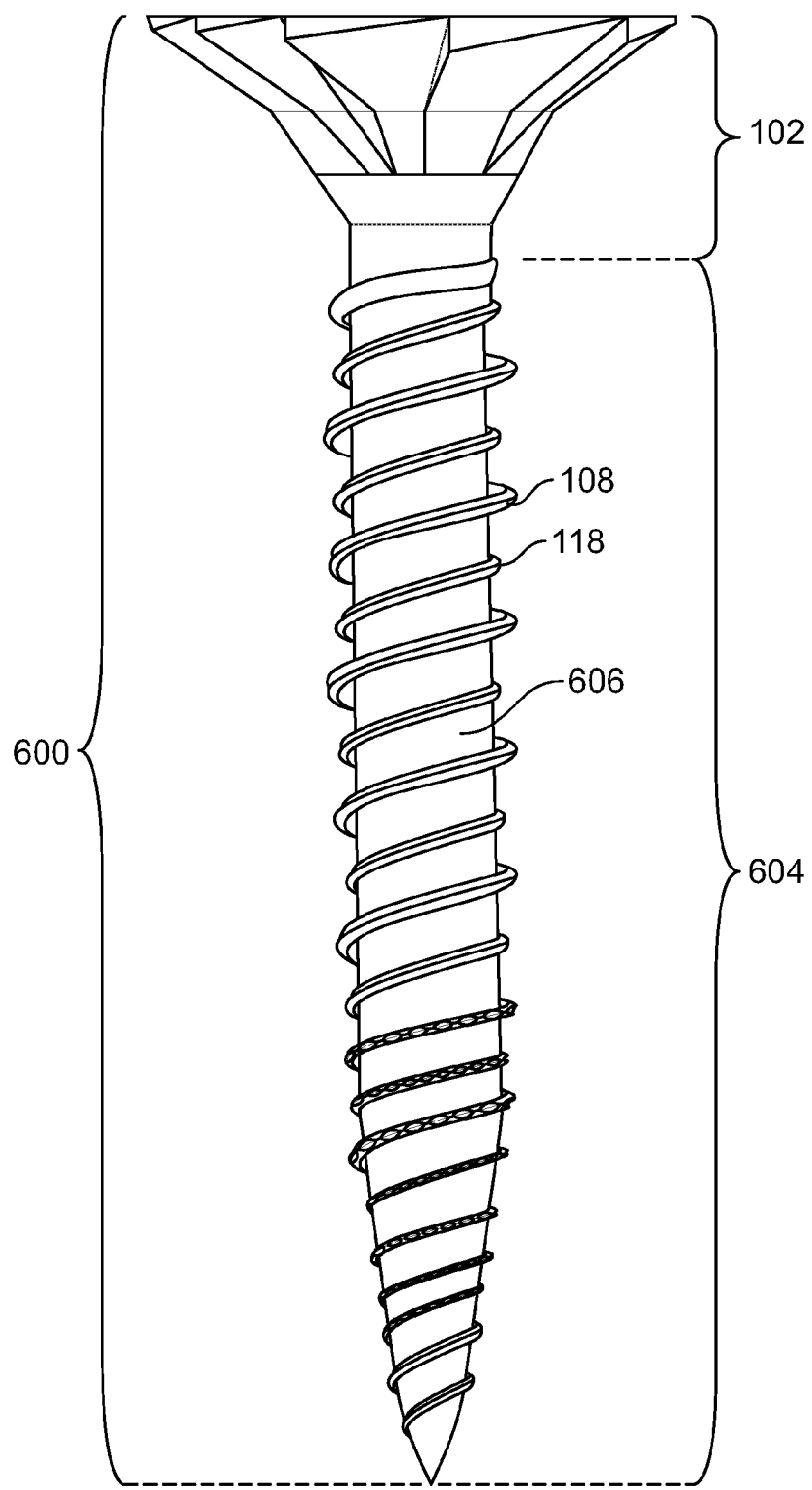
FIG. 6 is a front view of a fastener according to another embodiment.

FIG. 6 is a front view of a fastener 600 according to another embodiment. The fastener 600 may represent a screw that can be used to fasten two or more bodies together. The fastener 600 can include the same head 102 as the fastener 100, which is joined with an elongated shank body 604 that is similar to the shank body 104. The head 102 and the body 604 may be formed as a single body, such as a single piece of metal or metal alloy. The shank body 604 includes an elongated cylindrical core 606 having the helical threads 108, 118 radially extending outward from the core 606. The helical threads 108, 118 can cut into one or more bodies that the fastener 600 is rotated or screwed into in order to secure the fastener 600 to the bodies. In contrast to the fastener 100, the shank body 604 of the fastener 600 does not include the sizing knurl 110. Instead, the helical threads 108, 118 may extend to the head 102 and not be separated from the head 102 along the length of the shank body 604.

In one embodiment, a fastener includes an elongated shank body having one or more helical threads and a head connected with the body. The head includes a drive design indentation extending into a first side of the head that is configured to be engaged with a drive tool, the head having radially projecting saw teeth extending around an outer perimeter of the head.

The radially projecting saw teeth can be curved in a clockwise direction. The radially projecting saw teeth may include curved outer edges that are convex from the outer perimeter of the head to intersections with straight edges that radially project from the outer perimeter of the head. Optionally, the radially projecting saw teeth of the head form a serrated outer edge of the head.

The head of the fastener can include ramped surfaces that are opposite of the radially projecting saw teeth on a second side of the head. The ramped surfaces may be oriented at oblique angles to the first side of the head. The head can have a circular shape with the radially projecting saw teeth projecting outward from the circular shape.

In one embodiment, a fastener includes an elongated shank body having one or more threads and a head connected with the body and configured to be engaged with a drive tool. The head has curved saw teeth extending around an outer perimeter of the head.

The curved saw teeth may radially project from the outer perimeter of the head. The saw teeth can be curved in a clockwise direction. Optionally, the saw teeth include curved outer edges that are convex from the outer perimeter of the head to intersections with straight edges that radially project from the outer perimeter of the head. The saw teeth of the head may form a serrated outer edge of the head.

The head can include ramped surfaces that are opposite of the saw teeth on a second side of the head. The ramped surfaces can be oriented at oblique angles to the first side of the head. The head may have a circular shape with the saw teeth projecting outward from the circular shape.

In one embodiment, a fastener includes an elongated shank body and a head connected with the body. The head can have curved radially projecting saw teeth extending around an outer perimeter of the head.

The head can include a drive design indentation extending into a first side of the head that is configured to be engaged with a drive tool. The saw teeth may be curved in a clockwise direction. The saw teeth can include curved outer edges that are convex from the outer perimeter of the head to intersections with straight edges that radially project from the outer perimeter of the head. The saw teeth of the head may form a serrated outer edge of the head.

The head can include ramped surfaces that are opposite of the saw teeth on a second side of the head. The ramped surfaces may be oriented at oblique angles to the first side of the head. The head may have a circular shape with the saw teeth projecting outward from the circular shape.

It is to be understood that the above description is intended to be illustrative, and not restrictive. For example, the above-described embodiments (and/or examples thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure. For example, the recitation of a "mechanism for," "module for," "device for," "unit for," "component for," "element for," "member for," "apparatus for," "machine for," or "system for" is not to be interpreted as invoking 35 U.S.C. §112(f) and any claim that recites one or more of these terms is not to be interpreted as a means-plus-function claim.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" or "an embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A fastener comprising:
a shank body elongated along a center axis and having one or more helical threads; and
a head connected with the body, the head including a drive design indentation extending into a first side of the head that is configured to be engaged with a drive tool, the head having radially projecting saw teeth extending around an outer perimeter of the head,
wherein each of the radially projecting saw teeth includes a curved outer edge and a straight edge, the curved outer edge having a continuous convex curvature that extends from the straight edge of a neighboring radially projecting saw tooth to the straight edge of the radially projecting saw tooth that includes the curved outer edge; and
wherein each straight edge radially projects from the outer perimeter of the head along a straight line from the center axis.

2. The fastener of claim 1, wherein the radially projecting saw teeth are curved in a clockwise direction.

3. The fastener of claim 1, wherein the radially projecting saw teeth include the curved outer edges that are convex from the outer perimeter of the head to intersections with the straight edges that radially project from the outer perimeter of the head.

4. The fastener of claim 1, wherein the radially projecting saw teeth of the head form a serrated outer edge of the head.

5. The fastener of claim 1, wherein the head includes ramped surfaces that are opposite of the radially projecting saw teeth on a second side of the head.

6. The fastener of claim 5, wherein the ramped surfaces are oriented at oblique angles to the first side of the head.

7. The fastener of claim 1, wherein the head has a circular shape with the radially projecting saw teeth projecting outward from the circular shape.

8. A fastener comprising:
a shank body elongated along a center axis and having one or more threads; and
a head connected with the body and configured to be engaged with a drive tool, the head having curved saw teeth extending around an outer perimeter of the head,
wherein each of the curved saw teeth includes a curved outer edge and a straight edge, the curved outer edge having a continuous convex curvature that extends from the straight edge of a neighboring curved saw tooth to the straight edge of the curved saw tooth that includes the curved outer edge; and
wherein each straight edge radially projects from the outer perimeter of the head along a straight line from the center axis.

9. The fastener of claim 8, wherein the curved saw teeth radially project from the outer perimeter of the head.

10. The fastener of claim 8, wherein the saw teeth are curved in a clockwise direction.

11. The fastener of claim 8, wherein the saw teeth include the curved outer edges that are convex from the outer perimeter of the head to intersections with the straight edges that radially project from the outer perimeter of the head.

12. The fastener of claim 8, wherein the saw teeth of the head form a serrated outer edge of the head.

13. The fastener of claim 8, wherein the head includes ramped surfaces that are opposite of the saw teeth on a second side of the head.

14. The fastener of claim 13, wherein the ramped surfaces are oriented at oblique angles to the first side of the head.

15. The fastener of claim 8, wherein the head has a circular shape with the saw teeth projecting outward from the circular shape.

16. A fastener comprising:
a shank body elongated along a center axis; and
a head connected with the body, the head having curved radially projecting saw teeth extending around an outer perimeter of the head,
wherein each of the curved radially projecting saw teeth includes a curved outer edge and a straight edge, the curved outer edge having a continuous convex curvature that extends from the straight edge of a neighboring curved radially projecting saw tooth to the straight edge of the curved radially projecting saw tooth that includes the curved outer edge; and
wherein each straight edge radially projects from the outer perimeter of the head along a straight line from the center axis.

17. The fastener of claim 16, wherein the head also includes a drive design indentation extending into a first side of the head that is configured to be engaged with a drive tool.

18. The fastener of claim 16, wherein the saw teeth are curved in a clockwise direction.

19. The fastener of claim 16, wherein the saw teeth include the curved outer edges that are convex from the outer perimeter of the head to intersections with the straight edges that radially project from the outer perimeter of the head.

20. The fastener of claim 16, wherein the saw teeth of the head form a serrated outer edge of the head.

* * * * *